Jan. 5, 1932.  S. J. LONERGAN  1,839,236
ELECTRIC WATER HEATER
Filed Nov. 11, 1927
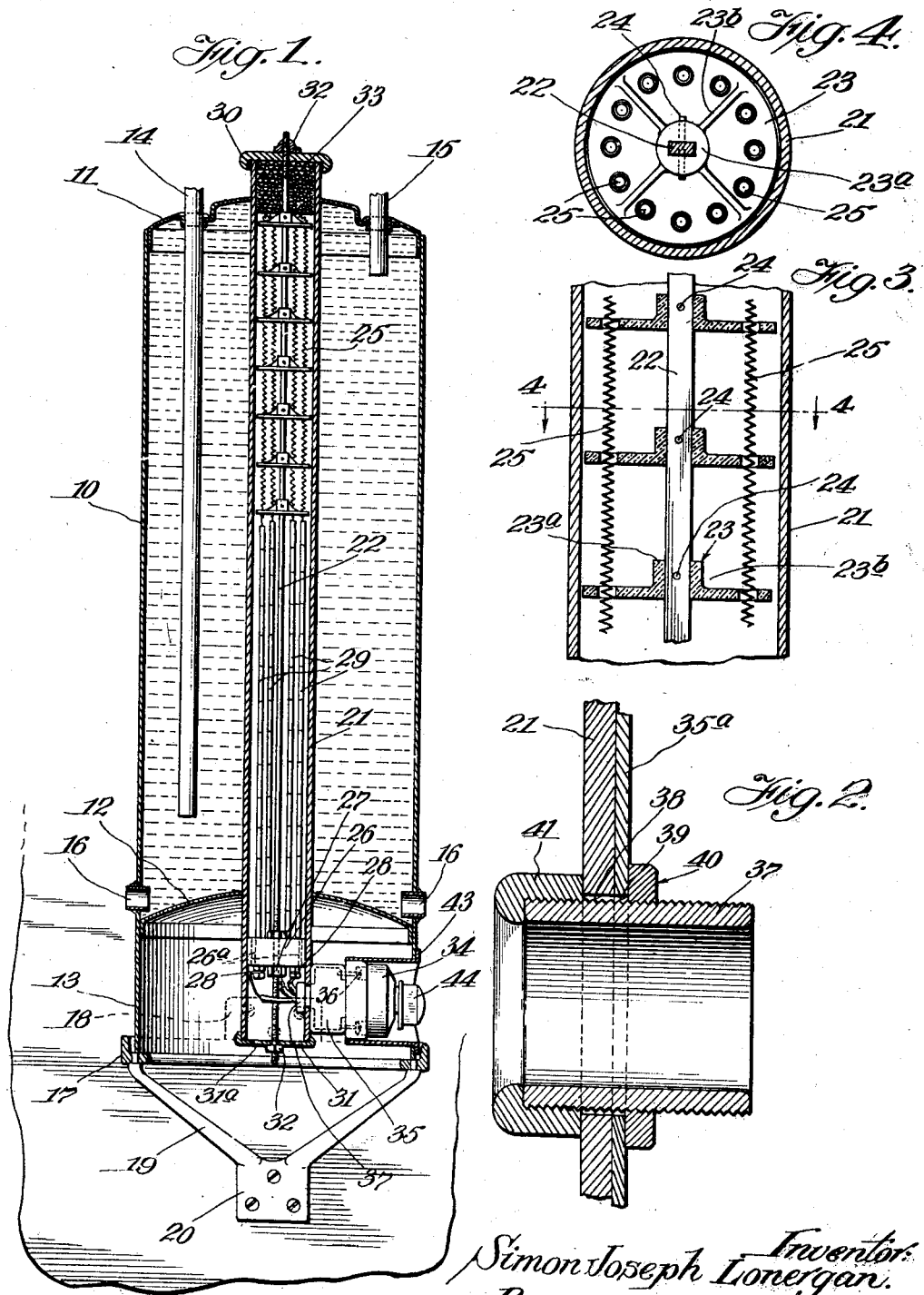
Simon Joseph Lonergan, Inventor
By Rector, Hibben, Davis & Macauley
Attys.

Patented Jan. 5, 1932

1,839,236

UNITED STATES PATENT OFFICE

SIMON JOSEPH LONERGAN, OF LA PORTE, INDIANA, ASSIGNOR TO BASTIAN-MORLEY COMPANY, OF LA PORTE, INDIANA, A CORPORATION OF INDIANA

ELECTRIC WATER HEATER

Application filed November 11, 1927. Serial No. 232,501.

My invention relates to electric water heaters and has to do especially with a novel form of instantaneous heater which is well adapted for use in small apartments and by individual operators in barber shops, beauty parlors, and similar places.

One of the objects of my invention is to provide a light weight, highly efficient and compact electric heater structure which may be readily mounted upon a wall surface, or, if desired upon any form of supporting standard, the heating element being located within the storage tank adjacent the top thereof, so that water at that portion from which it is drawn is first and quickly heated.

Another object is to provide a tubular support extending through and beyond the end walls of the storage tank to receive the electrical heating element, such support having removable end closures which permit removal of the heating element from either end thereof and whereby such element may be readily and quickly removed regardless of the location in which the heater is mounted, all without disturbing the other heater members.

A further object is to adjustably anchor the heating element to its enclosing tube in such a way that such element may be located at different positions relative to the top of the storage tank and the water therein to produce and insure the most efficient and rapid heating effect.

Still another object is to provide the storage tank with a depending skirt portion which encloses and conceals the lower projecting end of the heater tube, the electric switch and the associated electrical connections to prevent tampering and accidental contact with the same, aid in compactness of the structure and make the heater as a whole pleasing in general appearance. To that end, the electric switch is supported by the heater tube within the depending tank skirt portion, and it is readily accessible for operation through a suitable shielded opening in the side of the tank skirt.

Additional objects are to arrange all the heater parts so that they may be readily and quickly assembled and disassembled; to locate the heating element terminals beneath the bottom of the storage tank remote from the heater resistance coils to keep such terminals cool, and thereby lessening the deteriorating effect of the heat upon the same and the electrical connectors; the provision of insulating means within the heating element for preventing loss of heat through its upper end which is exposed to the air; to provide heater resistance wire supports and guides of such construction that they may be positively anchored together to minimize the possibility of displacement and breakage of the same and reduce the deteriorating effect of the heat thereby lengthening the life of the heating element as a whole; the provision of means for taking care of condensation which may take place within the heating element tube; and to enable the heater to be transported as an entirely assembled unit without danger of breakage, or other injury, to the heating element.

Other objects and advantages will become apparent as this description progresses and by reference to the drawings, where Figure 1 is a vertical section through an electric water heater embodying my invention, such heater being shown supported from an upright wall surface;

Fig. 2 is an enlarged detail vertical section view taken through a portion of the lower part of the heating-element-supporting tube and the electric switch mechanism, showing the manner of attaching such parts together;

Fig. 3 is an enlarged vertical section through a portion of the upper part of the central tube and the heating element therein, showing the relation between these parts and the manner of securing the spaced heater disks to their supporting rod;

Fig. 4 is a horizontal section taken substantially on line 4—4 of Fig. 3.

Referring particularly to the form shown in the drawings, I employ a cylindrical storage tank 10 having a top 11 and bottom 12 of usual form sealed thereto in any desired manner. The side wall of the tank is extended downwardly below the bottom 12 to provide a cylindrical depending skirt 13. The usual cold water supply pipe 14 and service or hot water pipe 15 are carried by the top 11, and normally closed drain openings 16 are located adjacent in the side wall. The tank is supported by a semi-circular bracket 17 which is L-shaped in cross section, the lower edge of the tank skirt 13 being seated upon the horizontal flange or base of such bracket. The bracket has preferably an upright flat extension 18 at the rear, which may be attached to the wall surface by screws or other fastening devices; and its outer edge may be rigidly braced by additional downwardly and inwardly inclined arms 19 attached to a plate 20 which may be secured to the wall surface by screws or the like. This bracket 17 embraces the tank so as to prevent lateral displacement and efficiently serves the purpose without further fastening means but, if desired, the upper portion of the tank may be further secured. Instead of the bracket 17 being mounted upon a wall surface, it may be a part of or mounted upon an upright standard or any other desirable form of support.

To rapidly heat the water in the tank and have a supply of hot water ready for use immediately, I employ an electrical heating element mounted substantially within the body of water within the tank and at the top hereof. To this end, I employ a tube 21 extending through the central part of the tank and through and beyond suitable openings in the tank top and bottom, such tube being permanently secured to the top and bottom in a water tight manner by any desired form of sealing means.

The tube 21 is adapted to freely receive a heating element which comprises a rectangular shaped supporting rod 22 threaded at its ends and extending throughout the length of and beyond the ends of the tube 21. A plurality of circular porcelain disks 23 are mounted upon the rod 22. These disks have integral upstanding central portions 23ª strengthened by radial ribs 23ᵇ, and central rectangular openings are provided to receive the similarly shaped rod. They are held in spaced relation on the rod by pins 24 which pass through both the upstanding portion 23ª and the rod (Figs. 3 and 4). Each of these disks is provided near its outer edge with a circular row of openings adapted to receive a plurality of resistance coils 25 which are passed back and forth through the several discs as shown in Figs. 1 and 4. It will be seen that the disks are so carried by the rod 22 that they cannot move relatively thereto in any direction, so that the parallel-mounted resistance coils 25 are always held in a predetermined fixed position for producing a maximum heating effect. This arrangement practically eliminates the use of parts which may be subject to rapid deterioration by the heat. The rod 22 near its lower end and, preferably, at a point beneath the tank bottom 12 carries an insulated terminal block 26 secured rigidly in adjustable position thereon by the nuts 27. This block and the terminals 28 are at such a point remote from the resistance coils that they remain cool. The terminals 28 are connected to the comparatively long ends of the resistance coils 25, and these ends carry insulating sleeves 29.

The ends of the tube 22 are closed by caps 30 and 31 which are provided with central openings to receive the projecting ends of the heating element rod 22, such rod being secured in place thereupon by nuts 32. With this construction, it is obvious that the rod 22, and the heating element as a whole, may be adjusted vertically in the tube 21 to position the heating coils 25 at the most desirable and efficient position relative to the top of the tube and tank; that is, by loosening the nut 32 in the upper cap and tightening the nut 32 in the lower cap, the element may be lowered, and vice versa when the nuts are turned in the opposite directions.

The space within the tube 21 is obviously a dead air space and the efficiency of the heating element is, therefore, very high, practical adaptation having shown that it exceeds 95%. Due to the end of the tube projecting beyond the top of the tank, there is a tendency for a heat loss at that point unless otherwise provided for. To take care of this condition, and prevent the loss of heat at this point, I employ an asbestos plug 33 snugly fitting the tube and mounted upon the rod 22 between the cap 30 and the uppermost disk 23. This plug is, preferably, of sufficient length that it projects slightly beneath the top wall 11, so as to confine the heat within the tank surfaces and substantially within the body of water in the tank. In the event that condensation takes place within the tube, it is drained through the peripheral grooves 26ª in the terminal block 26 and through the small openings 31ª in the bottom cap 31, so that there will be no effect upon the functioning of the heating element.

The electric switch 34 is a three-terminal switch of the on and off type, and its terminals are connected to the heating element terminals 28 in such a manner as to provide for two resistance coils in parallel for a greater heating effect as will be well understood. This switch is carried by the lower projecting part of the tube 21, and preferably, but not necessarily, by the structure shown in Fig. 2 which comprises a metallic spacer 35 secured to the switch 34 as by screws 36 (Fig. 1) and which has a bottom 35ª adapted to seat against the adjacent surface of the tube. A threaded nipple 37 extends through aligned openings 38 and 39 in the tube and spacer, respectively, (Fig. 2) and engages a lock nut 40. The other end of this nipple which projects within the tube 21 is engaged by a nut 41 which is so shaped that it engages both the inner wall of the tube 21 and the edge of the nipple 37 so as to aid in rigidly supporting and holding these parts together when the nuts 40 and 41 are drawn tight. Access to the switch 34 is provided through an opening in the side of the tank skirt 13 which receives a laterally extending collar 43 having a flanged end seated against the skirt. This collar extends inwardly toward the tube 21 and snugly engages the switch base to further support the switch and render the same readily accessible. This collar 43 may be carried by the switch so as to be removed with it or, if desired, it may be attached to the tank skirt by its flange. It will be noted that the switch button 44 is, by the foregoing arrangement, carried so as to not extend beyond the outer edge of the tank skirt so that it may not be struck and accidentally turned and the comparatively large opening in the side of the skirt together with collar 43 provides ready access to the same, as well as aiding in concealing the electrical connections.

It is believed that the operation of the heater will be obvious from the foregoing, and it may be stated generally as follows: When it is desired to heat the water, the switch button 44 is turned to "on" position rendering the heating element effective. The water at the top of the tank adjacent the heating element is immediately heated and water at this point may be drawn off through the service pipe 15. As this action continues to take place, the water throughout the tank will be heated. The cold water conduit 14 constantly supplies the tank as the hot water is drawn off. The heater as a whole is very compact and may be readily mounted in conspicuous places. The construction of the tube 21 is such that the heating element may be readily and quickly removed from the tank regardless whether the tank be located close to the floor or at such a point where there is not sufficient head room for lifting the element through the top of the tube. The length of the life of the heater is greatly increased, reducing repairs and replacements to a minimum due to the relative locations of and manner of mounting of the members of the heating element. The apparatus is very economical in operation and substantially all of the heat generated by the heating element is applied directly to the water in the tank which accounts, in part, for the very high efficiency.

While I have shown and described only one form of my invention, it is to be understood that various changes may be made in the details and arrangement of parts without departing from the spirit and scope of my invention as defined by the claims which follow. For instance, if desired, automatic or thermostatic means controlled by the temperature of the water, or otherwise, may be employed instead of the band operated switch for turning the heater on or off and for controlling the temperature of the water.

I claim:

1. An electric water heater comprising a storage tank, a tubular member passing through said tank throughout its length and supported by the ends of said tank, said tube being constructed to contact the main body of water in said tank and to exclude the water therefrom, a removable closure for each end of said tubular member, and an electric heating element carried in said tube and having a part thereof adjustably anchored to both said end closures.

2. An electric water heater comprising a storage tank, a tubular member passing through said tank throughout its length and supported by the ends of said tank, a closure for each end of said tubular member, and an electric heating element disposed within said tube, said element including resistance coils and a support therefor which extends throughout the length of said tube and engages said end closures, and means cooperating with said support and end closures for securing said element within said tube.

3. An electric water heater comprising a storage tank, a centrally disposed tube extending throughout the length of and carried by the ends of said tank, a closure for each end of said tube, a heating element disposed within said tube and having a member which engages both said end closures, and means for adjustably securing said member to said end closures to vary the position of said element within said tube.

4. An electric water heater comprising a storage tank, an elongated heating element disposed within said tank out of contact with and beneath the level of the water therein, and manually-adjustable means supporting each end of said heating element and accessible exteriorly of said tank for adjusting said element to various positions relative to the upper end of said tank and the level of the water therein.

5. In an electric water heater, a storage tank having top and bottom walls, a tube passing throughout the length of said tank and through said top and bottom walls, an electrical heating element carried within said tube for generating heat adjacent the top of said tube and said top wall, and closures for said tube for providing a dead air space therein and preventing direct loss of heat therefrom, said heating element including a member extending throughout the length of said tube and having threaded end portions passing through said end closures, and means engaging said threaded end portions and cooperating with said end closures for rigidly securing said element within said tube and providing for adjustment of said element along said tube.

6. An electric water heater, a storage tank, a tube carried within said tank and having an end portion projecting through the top thereof, a heating element carried within said tube, an end closure for said tube, and a heat insulating plug within said tube between its end closure and said heating element.

7. In an electric water heater, a storage tank, a tubular member extending into said tank and having a part projecting through an end wall thereof, a heating element within said tube, an end closure for said tube, and an asbestos plug within said tube between said heating element and said end closure to prevent loss of heat through the exposed end portion of said tube.

8. In an electric water heater, a tank, a tube within said tank and extending beneath the level of the water therein and having one end carried by the top wall of said tank, an end closure for said tube, a heating element carried within said tube internally of said tank and beneath the level of the water therein, heat insulating means within said tube between said end closure and said heating element for confining the heat generated by said element beneath said tank and substantially beneath the level of the water therein.

9. In combination in an electric water heater, a storage tank having top, bottom and side wall surfaces, the side wall being extended below said bottom to provide therearound a depending skirt, a tube passing through said tank and having an end portion projecting through said bottom wall and within said skirt portion, a heating element carried within said tube, a switch device supported by the lower porton of said tube within the confines of said skirt, a portion of said skirt being cut away to provide access to said switch.

10. In combination in an electric water heater, a storage tank having top, bottom and side walls, said side walls extending below said bottom to provide a continuous depending skirt, a tube extending within said tank and having an end projecting through the bottom thereof confined by said skirt, said skirt having an opening at one side to receive a cylindrical switch supporting member, a switch, including an operating member, mounted within said support and having a part engaged with the projecting end of said tube, a heating element within said tube, electrical connections between said heating element and said switch, said switch, the projecting end of said tube and said electrical connections being all confined within and concealed by said skirt.

11. In combination in an electrical water heater, a storage tank having top, bottom and side walls, said side walls being extended beneath said bottom to provide a depending skirt, a tube extending within said tank and having an end projecting through the bottom thereof confined by said skirt, an electrical heating element within said tube, a closure for said projecting end of said tube, a switch, said skirt having an opening in its side to receive a member adapted to engage said switch, and means for securing said switch to the side wall of the projecting end of said tube including a spacing device and detachable connections between said spacing device and said tube, said switch projecting through said skirt opening and within said member to such an extent as to prevent accidental contact therewith, and said switch and tube and heating element all being confined within and concealed by said tank skirt.

12. In an electric water heater, a storage tank having top and bottom walls, a tube passing centrally through said tank and through and beyond said top and bottom walls, and a heating element disposed within said tube for heating the water within said tank, said element including heat generating means located adjacent the top of said tube within said tank and beneath the level of the water therein, and terminal devices located adjacent the lower end of said tube and beneath the bottom of said tank in a cool environment.

13. An electric water heater comprising a storage tank, an imperforate tube having closed ends disposed within said tank and extending from end to end thereof, an electrical heating element within said tube adjacent the upper end of said tank, and means having adjustable engagement with both of the ends of said tube for supporting said heating element.

14. In combination in an electric water heater, a storage tank having top, bottom and side wall surfaces, the side walls being extended below said bottom to provide therearound a depending skirt, a tube passing through said tank and having an end portion projecting through said bottom wall and within said skirt portion, a heating element carried within said tube and a switch device bridged between the lower porton of said tube and said skirt.

In testimony whereof, I have subscribed my name.

SIMON JOSEPH LONERGAN.